(12) United States Patent
Subramanian et al.

(10) Patent No.: US 8,221,809 B2
(45) Date of Patent: Jul. 17, 2012

(54) ENCAPSULATED LABILE COMPOUND COMPOSITIONS AND METHODS OF MAKING THE SAME

(75) Inventors: Srinivasan Subramanian, Broomfield, CO (US); Brian J. Connolly, Broomfield, CO (US); William A. Hendrickson, Stillwater, MN (US)

(73) Assignee: Martek Biosciences Corporation, Columbia, MD (US)

( * ) Notice: Subject to any disclaimer, the term of this patent is extended or adjusted under 35 U.S.C. 154(b) by 607 days.

(21) Appl. No.: 11/767,366

(22) Filed: Jun. 22, 2007

(65) Prior Publication Data
US 2008/0026108 A1    Jan. 31, 2008

Related U.S. Application Data

(60) Provisional application No. 60/805,590, filed on Jun. 22, 2006, provisional application No. 60/945,040, filed on Jun. 19, 2007.

(51) Int. Cl.
*A23B 4/10* (2006.01)
(52) U.S. Cl. ............... 426/89; 426/96; 426/98; 426/302
(58) Field of Classification Search .................... 426/89, 426/98
See application file for complete search history.

(56) References Cited

U.S. PATENT DOCUMENTS

| | | | |
|---|---|---|---|
| 3,655,864 A | 4/1972 | Grass, Jr. et al. | |
| 3,804,776 A | 4/1974 | Yazawa et al. | |
| 3,819,838 A | 6/1974 | Smith et al. | |
| 4,217,370 A | 8/1980 | Rawlings et al. | |
| 4,332,790 A | 6/1982 | Sozzi et al. | |
| 4,533,557 A | 8/1985 | Maruyama et al. | |
| 4,675,189 A | 6/1987 | Kent et al. | |
| 4,678,710 A | 7/1987 | Sakimoto et al. | |
| 4,895,725 A | 1/1990 | Kantor et al. | |
| 4,957,748 A | 9/1990 | Winowiski | |
| 5,015,483 A | 5/1991 | Haynes et al. | |
| 5,106,639 A | 4/1992 | Lee et al. | |
| 5,143,737 A | 9/1992 | Richardson | |
| 5,153,177 A | 10/1992 | Chaundy et al. | |
| 5,190,775 A | 3/1993 | Klose | |
| 5,206,041 A | 4/1993 | Wellons | |
| 5,213,810 A | 5/1993 | Steber | |
| 5,356,636 A | 10/1994 | Schneider et al. | |
| 5,496,571 A | 3/1996 | Blagdon et al. | |
| 5,698,244 A | 12/1997 | Barclay | |
| 5,756,143 A | 5/1998 | Cain et al. | |
| 5,789,001 A | 8/1998 | Klopfenstein et al. | |
| 5,874,470 A | 2/1999 | Nehne et al. | |
| 5,908,654 A | 6/1999 | Cain et al. | |
| 5,985,348 A | 11/1999 | Barclay | |
| 6,013,286 A | 1/2000 | Klose | |
| 6,083,520 A | 7/2000 | Toneby | |
| 6,245,366 B1 | 6/2001 | Popplewell et al. | |
| 6,248,909 B1 | 6/2001 | Akimoto et al. | |
| 6,258,964 B1 | 7/2001 | Nakajima et al. | |
| 6,444,227 B1 | 9/2002 | Leuenberger et al. | |
| 6,444,242 B1 | 9/2002 | Skelbaek et al. | |
| 6,599,556 B2 | 7/2003 | Stark et al. | |
| 6,770,104 B2 | 8/2004 | Murphy | |
| 6,974,592 B2 | 12/2005 | Yan | |
| 6,991,823 B2 | 1/2006 | Augustin et al. | |
| 7,001,610 B2 | 2/2006 | Stewart | |
| 2003/0072787 A1 | 4/2003 | Wilson et al. | |
| 2003/0185960 A1 | 10/2003 | Augustin et al. | |
| 2003/0193102 A1 | 10/2003 | Yan | |
| 2003/0211221 A1* | 11/2003 | Abril et al. ................... 426/601 |
| 2004/0191390 A1 | 9/2004 | Lee | |
| 2005/0019416 A1 | 1/2005 | Yan | |
| 2005/0067726 A1 | 3/2005 | Yan et al. | |
| 2005/0233002 A1 | 10/2005 | Trubiano et al. | |
| 2005/0238788 A1 | 10/2005 | Buononato et al. | |
| 2005/0281926 A1 | 12/2005 | Yang et al. | |
| 2006/0159805 A1 | 7/2006 | Funda et al. | |
| 2006/0286205 A1 | 12/2006 | Fichtali et al. | |
| 2008/0020086 A1 | 1/2008 | Abril et al. | |
| 2008/0096964 A1 | 4/2008 | Subramanian et al. | |
| 2009/0004233 A1 | 1/2009 | Connolly et al. | |

FOREIGN PATENT DOCUMENTS

| | | |
|---|---|---|
| EP | 0 249 282 A1 | 12/1987 |
| EP | 0385081 | 5/1990 |
| EP | 0 387 597 A2 | 9/1990 |
| EP | 0385081 | 9/1990 |
| EP | 0 626 172 A1 | 11/1994 |
| EP | 0 862 369 B1 | 9/1998 |
| EP | 1616486 | 1/2006 |
| EP | 1702675 | 9/2006 |
| GB | 1 217 365 A | 12/1970 |
| JP | 63-023736 A | 2/1988 |
| JP | 08-336360 A | 12/1996 |
| WO | WO 91/05482 | 5/1991 |
| WO | WO 92/12711 A1 | 8/1992 |
| WO | WO 95/06414 A1 | 3/1995 |

(Continued)

OTHER PUBLICATIONS

Klinkesorn et al, "Stability of Spray-Dried Tuna Oil Emulsions Encapsulated with Two-Layered Interfacial Membranes", J. Agric. Food Chem., Sep. 23, 2005.*

*Lactobacillus acidophilus*, http://alternativedr.com/lactobacillus_acidophilus, archive.org Feb. 2006.*

Gouin, S. Microencapsulation: Industrial Appraisal of Existing Technologies and Trends. Food Science and Technology 15 (2004) 330-347.

International Preliminary Report of Patentability and Written Opinion for PCT Application No. PCT/US07/071938, mailed Jan. 8, 2009, 4 pages.

International Search Report and Written Opinion for PCT Application No. PCT/US07/071938, mailed Nov. 13, 2007, 8 pages.

(Continued)

Primary Examiner — Lien Tran

(74) Attorney, Agent, or Firm — Sterne, Kessler, Goldstein & Fox P.L.L.C.

(57) ABSTRACT

Products comprising labile compounds, such as polyunsaturated fatty acids, and having first and second encapsulants are disclosed. A first encapsulant can be a spray dried coating and the second encapsulant can be a prill coating. Methods of making the same are provided.

38 Claims, 1 Drawing Sheet

FOREIGN PATENT DOCUMENTS

| | | |
|---|---|---|
| WO | WO 96/40106 A2 | 12/1996 |
| WO | WO 97/37546 A1 | 10/1997 |
| WO | WO 98/18338 A1 | 5/1998 |
| WO | WO 00/24360 A2 | 5/2000 |
| WO | 01/72135 | 10/2001 |
| WO | 01/74175 | 10/2001 |
| WO | WO 01/80656 A1 | 11/2001 |
| WO | 03/086104 | 10/2003 |
| WO | WO 03/086104 | 10/2003 |
| WO | 2004/041251 | 5/2004 |
| WO | WO 2004/041251 | 5/2004 |
| WO | 2005/030229 | 4/2005 |
| WO | 2005/048998 | 6/2005 |
| WO | WO 2005/089569 | 9/2005 |
| WO | WO 2005/105851 | 11/2005 |
| WO | WO 2006/137799 | 12/2006 |
| ZA | 876440 A | 3/1988 |

OTHER PUBLICATIONS

Clark, Jim, "The Hydrogenation of Alkenes", 5 pages, downloaded from "chemguide" at http://www.chemguide.co.uk/organicprops/alkenes/hydrogenation.html on Sep. 4, 2007, United Kingdom.

Encyclopedia, University of Pennsylvania Health System, *Definition of Fats*, 3 pages, The Trustees of the University of Pennsylvania, downloaded from http://pennhealth.com/ency/article/002468.htm on Sep. 4, 2007.

Formo, M.W., et al., "Composition and Characteristics of Individual Fats and Oils," in *Bailey's Industrial Oil and Fat Products*, Swern, D. (Ed.), vol. 1, 4th edition, pp. 338-339 and 348-349, John Wiley & Sons, Inc., New York, United States (1979).

Franklin, S.T., et al., "Dietary marine algae (*Schizochytrium* sp.) increases concentrations of conjugated linoleic, docosahexaenoic and transvaccenic acids in milk of diary cows," *J. Nutr.* 129(11):2048-54, American Society of Nutritional Sciences, United States (Nov. 1999).

Gunstone, F.D., et al., *The Lipid Handbook*, 2nd edition, pp. 170, 171, 176, 177, Chapman & Hall: Electronic Publishing Division, London, England (1992).

Hagemeister, V.H., et al., "Zum Transfer von Omega-3-Fettsäuren in das Milchfett bei Kühen," *Milchwissenschaft 43*(3): 153, 155-58, Volkswirtschaftlicher Verlag, Germany (1988).

Papadopoulos, G., et al., "Effects of Dietary Supplements of Algae, Containing Polyunsaturated Fatty Acids, on Milk Yield and the Composition of Milk Products in Diary Ewes," *J. Dairy Research 69*: 357-65, Proprietors of Journal of Dairy Research, United Kingdom (2002).

Stecher, P.G., et al. (Eds.), "Tripuhyite," in *The Merck Index: An Encyclopedia of Chemicals and Drugs*, 8th edition, Merck Co., Inc., Rahway, New Jersey, United States (1968).

English language Abstract of South African Patent Publication No. ZA 8706440 A, Derwent-Acc-No. 1988-183193, published Mar. 4, 1988.

Office Action mailed Dec. 2, 2008, in U.S. Appl. No. 11/560,809, Abril et al., filed Nov. 16, 2006.

Office Action mailed Apr. 2, 2009, in U.S. Appl. No. 11/560,809, Abril et al., filed Nov. 16, 2006.

Office Action mailed Dec. 29, 2009, in U.S. Appl. No. 11/560,809, Abril et al., filed Nov. 16, 2006.

Office Action mailed Aug. 18, 2010, in U.S. Appl. No. 11/560,809, Abril et al., filed Nov. 16, 2006.

English language Abstract of Japanese Patent Publication No. JP 63-023736 A, Japanese Patent Office, Patent & Utility Model Gazette DB, Patent Abstracts of Japan, (1988).

Ogawa, S., et al., "Production and Characterization of O/W Emulsions Containing Cationic Droplets Stabilized by Lecithin-Chitosan Membranes," *J. Agric. Food Chem.* 51(9):2806-12, American Chemical Society, United States (2003).

\* cited by examiner

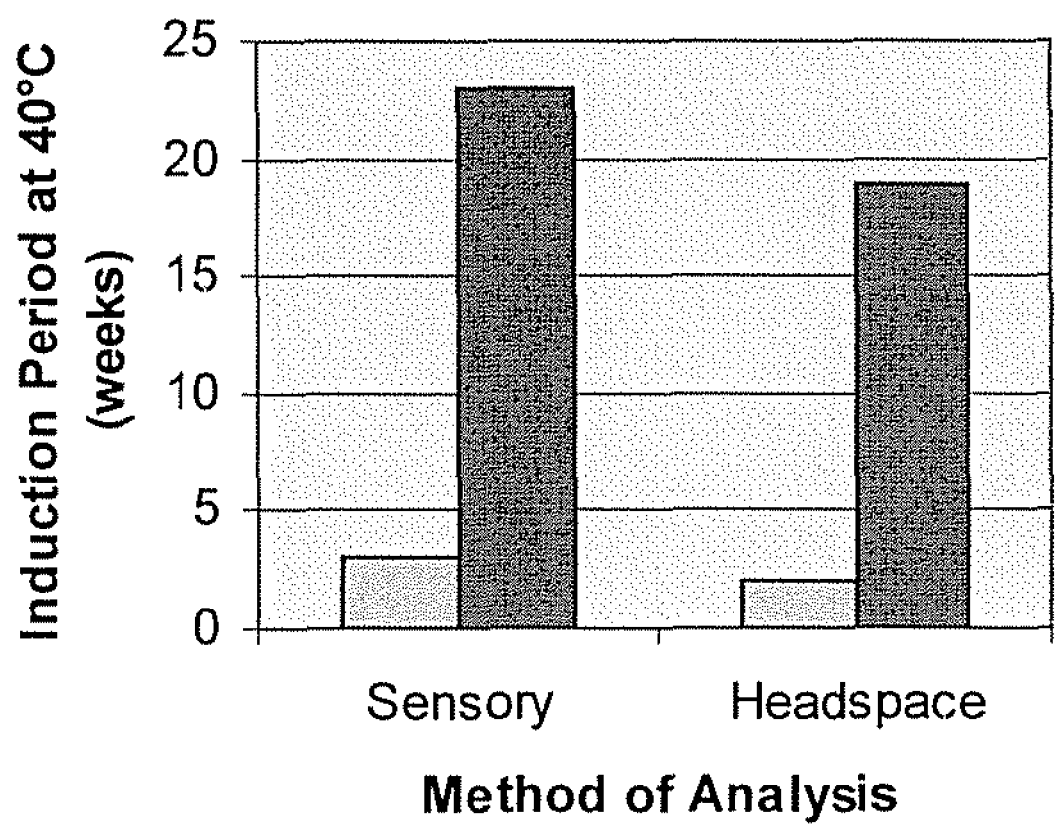

ENCAPSULATED LABILE COMPOUND COMPOSITIONS AND METHODS OF MAKING THE SAME

CROSS-REFERENCE TO RELATED TO RELATED APPLICATIONS

This application claims benefit under 35 U.S.C. §119(e) of U.S. Provisional Application No. 60/805,590, filed Jun. 22, 2006 and U.S. Provisional Application No. 60/945,040 filed Jun. 19, 2007. The disclosure of each of these application is incorporated by reference herein in its entirety.

FIELD OF THE INVENTION

The invention relates to encapsulated labile compounds, including polyunsaturated fatty acids, and methods of making the same.

BACKGROUND OF THE INVENTION

Labile compounds and compositions, such as polyunsaturated fatty acids (PUFAs), vitamins, minerals, antioxidants, hormones, amino acids, proteins, carbohydrates, coenzymes, and flavor agents, sensitive to any number of factors, can lose biological or other desired activity when unprotected. In addition, products (for example, decomposition products, degradation products, and oxidation products) that result from the chemical, physical, or biological change or breakdown of labile compounds and compositions, could lack the desired biological function and/or possess unwanted characteristics, such as having off-flavors, undesirable odors, irritation promoting activity and the like. There is often a need to introduce labile compounds and compositions, which are susceptible to chemical, physical, or biological change or breakdown, into pharmaceutical, nutritional, including nutraceutical, and industrial products. In such instances, protection of such compounds and compositions is desirable. With regard to PUFAs in particular, it is desirable to protect such lipids in food products from oxygen, trace metals and other substances which attack the double bonds of the PUFAs. Such protection reduces the likelihood of organoleptic problems, i.e., problems, relating to the senses (taste, color, odor, feel), such as off-flavors and undesirable odors, and other problems, such as loss of physiological activity, for instance. Such protection could potentially increase the shelf life of products containing them.

Encapsulating unstable compounds can protect them from undesirable chemical, physical, or biological change or breakdown while retaining their efficacy, such as biological or physiological efficacy. Microcapsules can exist in powdered form and comprise roughly spherical particles that contain an encapsulated (entrapped) substance. The particle usually has some type of shell, often a polymeric shell, such as a polypeptide or polysaccharide shell, and the encapsulated active product is located within the shell. Microencapsulation of a liquid, such as an oil, allows the formation of a particle that presents a dry outer surface with an entrained oil. Often the particles are a free-flowing powder. Microencapsulation therefore effectively enables the conversion of liquids to powders. Numerous techniques for microencapsulation are known depending on the nature of the encapsulated substance and on the type of shell material used. Methods typically involve solidifying emulsified liquid droplets by changing temperature, evaporating solvent, or adding chemical cross-linking agents. Such methods include, for example, spray drying, interfacial polymerization, hot melt encapsulation, phase separation encapsulation (solvent removal and solvent evaporation), spontaneous emulsion, solvent evaporation microencapsulation, solvent removal microencapsulation, coacervation, and low temperature microsphere formation and phase inversion nanoencapsulation (PIN). Microencapsulation is suitable for drugs, vitamins and food supplements since this process is adaptable by varying the encapsulation ingredients and conditions.

There is a particular need to provide microencapsulated forms of fats or oils, such as vegetable and marine oils, which contain PUFAs. Such microencapsulated forms would benefit from the properties of digestibility, stability, resistance to chemical, physical, or biological change or breakdown. Microencapsulated oils could conveniently be provided as a free flowing powdered form. Such a powder can be readily mixed with other dry or liquid components to form a useful product.

The ability to microencapsulate, however, can be limited by factors due to the nature of the microencapsulation process or the compound or composition to be encapsulated. Such factors could include pH, temperature, uniformity, viscosity, hydrophobicity, molecular weight, and the like. Additionally, a given microencapsulation process may have inherent limitations. For example, in microencapsulation techniques in which heat is used for drying, low-boiling point aromatics can be lost during the drying process. Additionally, the core may adhere to the surface of the encapsulation material, presenting a potential for increased oxidation and changes in the flavor balance of the finished product. In some cases, storage conditions must be carefully controlled to avoid an increase in the water activity and therefore the stability of the capsule and retention of volatiles within the capsule. During spray drying microencapsulation, the feed inlet temperature may not be high enough and result in incomplete drying and sticking in the drying chamber or clump formation in storage. Particulate inconsistencies may also occur under some process conditions. At temperatures that are too low, the particles may balloon and cracks can form in the surface of the particles. This may cause loss of volatile compounds and compromise the quality of the final product. Yet another drawback is that the coatings produced are often water-soluble and temperature sensitive. The present inventors have recognized the foregoing problems and that there is a need, therefore, to provide additional processes for encapsulation of compounds and compositions susceptible to chemical, physical, or biological change or breakdown.

SUMMARY OF THE INVENTION

The present invention is directed to products comprising labile compounds, such as polyunsaturated fatty acids, and having first and second encapsulants, as well as methods of making the same.

In one embodiment, the invention provides a product comprising a composition comprising a labile compound; a first encapsulant of the composition; and a second encapsulant of the first encapsulant, wherein the second encapsulant is a prill coating, wherein the product further comprises a Maillard reaction product.

The invention also provides a product comprising a composition comprising a labile compound; a first encapsulant of the composition; and a second encapsulant of the first encapsulant, wherein the product further comprises a Maillard reaction product formed by contacting the first encapsulant with the second encapsulant.

The invention further provides a product comprising a composition comprising a labile compound; a first encapsulant of the composition; and a second encapsulant of the first encapsulant, wherein the second encapsulant further comprises a Maillard reaction product.

The invention also provides a product comprising a composition comprising a labile compound; a first encapsulant of the composition; and a second encapsulant of the first encapsulant, wherein the product further comprises a Maillard reaction product formed in a non-aqueous environment.

The labile compound includes polyunsaturated fatty acid, a vitamin, a mineral, an antioxidant, a hormone, an amino acid, a protein, a carbohydrate, a coenzyme, a flavor agent, and mixtures of the foregoing.

The invention also provides a product comprising a composition comprising a labile compound selected from the group consisting of a polyunsaturated fatty acid, a vitamin, a mineral, an antioxidant, a hormone, an amino acid, a protein, a carbohydrate, a coenzyme, and mixtures thereof; a first encapsulant of the composition; and a prill coating on the first encapsulant.

In some embodiments, the labile compound comprises a polyunsaturated fatty acid from a source selected from the group consisting of a plant, an oilseed, a microorganism, an animal, and mixtures of the foregoing. In some embodiments, the microorganism includes algae, bacteria, fungi and protists.

In some embodiments, the source is selected from the group consisting of plant and oilseed selected from the group consisting of soybean, corn, safflower, sunflower, canola, flax, peanut, mustard, rapeseed, chickpea, cotton, lentil, white clover, olive, palm, borage, evening primrose, linseed and tobacco and mixtures thereof.

In some embodiments, the source includes a genetically modified plant, a genetically modified oilseed, and a genetically modified microorganism, wherein the genetic modification comprises the introduction of polyketide synthase genes.

In other embodiments, the microorganism includes Thraustochytriales, dinoflagellates, and *Mortierella*. In still other embodiments, the microorganism includes *Schizochytrium, Thraustochytrium* or a dinoflagellate of the genus *Crypthecodinium*.

In some embodiments, the animal includes an aquatic animal.

In some embodiments, the labile compound comprises a polyunsaturated fatty acid having a chain length of at least 18 carbons. In other embodiments, the labile compound comprises a polyunsaturated fatty acid including docosahexaenoic acid, omega-3 docosapentaenoic acid, omega-6 docosapentaenoic acid, arachidonic acid, eicosapentaneoic acid, stearidonic acid, linolenic acid, alpha linolenic acid (ALA), gamma linolenic acid (GLA), conjugated linolenic acid (CLA) and mixtures thereof.

In other embodiments, the labile compound comprises a vitamin selected from the group consisting of Vitamin A, Vitamin D, Vitamin E, Vitamin K, Vitamin B1, Vitamin B2, Vitamin B3, Vitamin B6, Vitamin C, Folic Acid, Vitamin B-12, Biotin, Vitamin B5 and mixtures thereof.

In other embodiments, the labile compound comprises a mineral selected from the group consisting of calcium, iron, iodine, magnesium, zinc, selenium, copper, manganese, chromium, molybdenum and mixtures thereof.

In still other embodiments, the labile compound comprises an antioxidant selected from the group consisting of lycopene, lutein, zeaxanthin, alpha-lipoic acid, coenzymeQ, beta-carotene and mixtures thereof.

In further embodiments, the labile compound comprises an amino acid selected from the group consisting of arginine, aspartic acid, carnitine, cysteine, glutamic acid, glutamine, glycine, histidine, isoleucine, leucine, lysine, methionine, phenylalanine, proline, serine, threonine, tryptophan, tyrosine, valine, SAM-e and mixtures thereof.

In some embodiments in which the labile compound is a flavor agent, the flavor agent comprises a flavor oil, oleoresin or mixtures thereof.

In some embodiments, the first encapsulant of the composition comprising the labile compound includes a whole cell, a biomass hydrolysate, an oilseed and an encapsulated isolated labile compound.

In other embodiments, the first encapsulant of the composition comprising the labile compound is a whole cell or a biomass hydrolysate derived from microorganisms. The microorganism includes *Lactococcus lactis, Lactobacillus acidophilus, Lactobacillus crispatus, Lactobacillus amylovorous, Lactobacillus gallinarum, Lactobacillus gasseri, Lactobacillus johnsonii, Lactobacillus rhamnosus, Lactobacillus brevis, Lactobacillus fermentum, Lactobacillus plantarum, Lactobacillus helveticus, Lactobacillus casei, Lactobacillus delbruckii, Lactobacillus bulgaricus, Lactobacillus plantarum, Lactobacillus GG, Bifidobacterium bifidum, Bifidobacterium breve, Bifidobacteriun infantis, Bifidobacterium longum, Streptococcus thermophilus* and *Leuconostoc mesenteroides*.

In some embodiments, the first encapsulant of the composition comprising the labile compound is a dried whole cell. In some embodiments, the dried whole cell is a spray-dried whole cell.

In some embodiments, the first encapsulant is prepared by a method is selected from the group consisting of fluid bed drying, drum (film) drying, coacervation, interfacial polymerization, fluid bed processing, pan coating, spray gelation, ribbon blending, spinning disk, centrifugal coextrusion, inclusion complexation, emulsion stabilization, spray coating, extrusion, liposome nanoencapsulation, supercritical fluid microencapsulation, suspension polymerization, cold dehydration processes, spray chilling (prilling), and evaporative dispersion processes.

In some embodiments, the prill coating is selected from the group consisting of a fatty acid monoglyceride; a fatty acid diglyceride; a fatty acid triglyceride; a free fatty acid; tallow; lard; beeswax; lanolin; shell wax; insect wax; vegetable wax, carnauba wax; candelilla wax; bayberry wax; sugar cane wax; mineral wax; paraffin microcrystalline petroleum wax; ozocerite wax; ceresin wax; montan synthetic wax, low molecular weight polyolefin; polyol ether-esters, sorbitol; Fischer-Tropsch process synthetic wax; rosin; balsam; shellac; stearylamide; ethylenebisstearylamide; hydrogenated castor oil; esters of pentaerythritol; mono and tetra esters of stearic acid; vegetable oil; a hydrogenated vegetable oil; and mixtures and derivatives of the foregoing.

In certain embodiments, the prill coating is a free fatty acid selected from the group consisting of stearic acid, palmitic acid, and oleic acid.

In embodiments in which the prill coating is tallow, the tallow includes beef tallow, mutton tallow, pork tallow, and lamb tallow.

In embodiments in which the prill coating is hydrogenated vegetable oil, the hydrogenated vegetable oil includes hydrogenated cottonseed oil, hydrogenated sunflower oil, hydrogenated safflower oil, hydrogenated soybean oil, hydrogenated corn oil, hydrogenated olive oil, hydrogenated canola oil, hydrogenated linseed oil, hydrogenated flaxseed oil.

In some embodiments, the prill coating further comprises a fat-soluble or fat dispersible oxygen scavenger, or a fat-soluble or fat dispersible antioxidant.

In some embodiments, the prill coating further comprises a colorant.

In some embodiments, the Maillard reaction product includes a reaction product of a reducing sugar and a protein selected from the group consisting of casein, whey solids, whey protein isolate, soy protein, skim milk powder, hydrolyzed casein, hydrolyzed whey protein, hydrolyzed soy protein, non-fat milk solids, gelatin, zein, and albumin.

In some embodiments, the Maillard reaction product includes a reaction product of a protein and a reducing sugar selected from the group consisting of fructose, glucose, glyceraldehyde, lactose, arabinose, maltodextrin, corn syrup solids and maltose.

The invention also provides a product selected from the group consisting of a food product, a cosmetic product, a pharmaceutical product, a nutraceutical product, and an industrial product, in which the product comprises a product comprising a composition comprising a labile compound; a first encapsulant of the composition; and a second encapsulant of the first encapsulant, wherein the second encapsulant is a prill coating, wherein the product further comprises a Maillard reaction product.

In some embodiments, the food product includes liquid food products or solid food products. Liquid food products include beverages, infant formula, liquid meals, liquid eggs, milk products, and multivitamin syrups. Beverages include energy drinks, fruit juices, and milk. Solid food products include baby food, yogurt, cheese, cereal, powdered mixes, baked goods, food bars, and processed meats.

In some embodiments, the product is insoluble in water. In other embodiments the product is physically stable for at least about 30 days, or oxidatively stable for at least about 30 days.

In other embodiments, the Maillard reaction product provides a desirable flavor to the product, a desirable aroma to the product, or antioxidant protection to the product.

In some embodiments, the Maillard reaction product is present in the outer 75% of the second encapsulant.

In some embodiments, the product has a particle size of between about 10 μm and about 3000 μm.

In further embodiments, the product comprises labile compound in an amount between about 1 weight percent and about 50 weight percent.

In still further embodiments, the product is in a form selected from the group consisting of a free-flowing powder, a bead, a chip, and a flake.

The invention also provides a method for preparing a product comprising encapsulating a first encapsulated product in the presence of an amino acid source and a reducing sugar to form a second encapsulated product, whereby Maillard reaction products are formed, and wherein the first encapsulated product comprises an encapsulant of a labile compound.

In some embodiments, the method further comprises handling the labile compound under conditions that reduce oxidative degradation prior to encapsulation.

In some embodiments of the method, the first encapsulated product comprises the amino acid source and the reducing sugar.

In other embodiments, the method further comprising processing the second encapsulated product into a particulate form. The processing includes fluid bed drying, drum (film) drying, coacervation, interfacial polymerization, fluid bed processing, pan coating, spray gelation, ribbon blending, spinning disk, centrifugal coextrusion, inclusion complexation, emulsion stabilization, spray coating, extrusion, liposome nanoencapsulation, supercritical fluid microencapsulation, suspension polymerization, cold dehydration processes, spray chilling (prilling), and evaporative dispersion processes.

In further embodiments, the step of encapsulating the first encapsulated product is conducted at a temperature above about 85° C.

In some embodiments, the step of encapsulating the first encapsulated product is conducted for between about 1 minute and about 15 minutes.

In other embodiments, the first encapsulated product is formed by a method comprising emulsifying an aqueous dispersion of a polyunsaturated fatty acid, protein and reducing sugar to form an emulsion; and drying the emulsion to form the first encapsulated product.

In further embodiments, the encapsulating the first encapsulated product comprises contacting the first encapsulated product with a prilling material, spraying the mixture of the first encapsulated product with the prilling material into droplets, and cooling the droplets below the melting point of the prilling material to form the second encapsulated product. In some embodiments, the prilling material has a melting point in the range of about 32° C. to about 122° C.

In other embodiments, the step of contacting the first encapsulated product with the prilling material is conducted at a temperature above about 85° C.

In still other embodiments, the step of contacting the first encapsulated product with the prilling material is conducted for between about 1 minute and about 15 minutes.

In further embodiments, the prilling material is hydrogenated vegetable oil, and the step of contacting the first encapsulated product with the prilling material is conducted for between about 1 minute and about 15 minutes, between 80° C. and 100° C.

In some embodiments, the first encapsulated product comprises about 25 wt % to about 80 wt % labile compound; about 5 wt % to about 25 wt % of an amino acid source; and about 15 wt % to about 70 wt % of a reducing sugar.

In other embodiments, the second encapsulated product is in particulate form and wherein the particulates comprise more than one coated encapsulated product per particulate.

BRIEF DESCRIPTION OF THE FIGURES

FIG. 1 shows the improvement in the induction period for a product of the invention (dark grey bars) when compared to a singly encapsulated product (light grey bars).

DETAILED DESCRIPTION OF THE INVENTION

The present invention provides encapsulated labile compounds and related methods for their preparation. In various embodiments, the invention provides a product comprising a composition comprising a labile compound, a first encapsulant of the composition, and a second encapsulant of the first encapsulant, and in some embodiments, the second encapsulant can be a prill coating. In some embodiments, the product further comprises a Maillard reaction product (MRP). As used herein, the term "a" or "an" refers to one or more of that entity; for example, a PUFA refers to one or more PUFAs or at least one PUFA. As such, the terms "a" (or "an"), "one or more" and "at least one" can be used interchangeably herein. It is also to be noted that the terms "comprising", "including", and "having" can be used interchangeably.

In one embodiment, the invention is directed to a product that includes a composition comprising a labile compound with a first encapsulant of the composition and a prill coating on the first encapsulant. In this embodiment, the product further comprises a Maillard reaction product. Reference to a prill coating or a second encapsulant being "on the first encapsulant" refers to the prill coating or second encapsulant coating or partially coating the first encapsulant and the composition having a labile compound. It will be recognized that the prill coating or the second encapsulant can either contact the first encapsulant directly or can contact the first encapsulant through one or more intervening layers of other materials.

In one embodiment, the invention is directed to a product that includes a composition comprising a labile compound selected from the group consisting of a polyunsaturated fatty acid, a vitamin, a mineral, an antioxidant, a hormone, an amino acid, a protein, a carbohydrate, a coenzyme, and mixtures thereof. The product further includes a first encapsulant of the composition and a prill coating on the first encapsulant.

In another embodiment, the invention is directed to a product that includes a composition comprising a labile compound with a first encapsulant of the composition and a second encapsulant of the first encapsulant. In this embodiment, the product further comprises a Maillard reaction product formed by contacting the first encapsulant with the second encapsulant.

In another embodiment, the invention is directed to a product that includes a composition comprising a labile compound with a first encapsulant of the composition and a second encapsulant of the first encapsulant. In this embodiment, the second encapsulant further comprises a Maillard reaction product.

In an additional embodiment, the invention is directed to a product that includes a composition comprising a labile compound with a first encapsulant of the composition and a second encapsulant of the first encapsulant. In this embodiment, the product further comprises a Maillard reaction product formed in a non-aqueous environment.

As used herein, a labile compound is a compound that will readily undergo a chemical and/or biological change or breakdown; that is, a compound that undergoes a noticeable change under intended use conditions. E.g., a PUFA in a food product can undergo some degradation in palatability that is noticeable by a consumer of the food product. Such conditions can be defined in terms of temperature, storage time, presence of water, and the like. Labile compounds include, without limitation, polyunsaturated fatty acids (PUFAs), vitamins, minerals, antioxidants, hormones, amino acids, proteins, carbohydrates, coenzymes, flavor agents and mixtures of the foregoing. In a further embodiment, the labile compound can be selected from PUFAs, vitamins, minerals, antioxidants, hormones, amino acids, proteins, carbohydrates, coenzymes, and mixtures thereof. The labile compound can be in the form of a solid particle, a liquid droplet, a gas bubble, or mixtures of these. In one preferred embodiment, the labile compound is a solid particle, and in another preferred embodiment, the labile compound is a liquid.

In some embodiments of the invention, the labile compound is a PUFA. In some embodiments, a PUFA has a chain length of at least 18 carbons. Such PUFAs are referred to herein as long chain PUFAs or LC PUFAs. In some embodiments, the PUFA can be docosahexaenoic acid C22:6(n-3) (DHA), omega-3 docosapentaenoic acid C22:5(n-3) (DPA(n-3)), omega-6 docosapentaenoic acid C22:5(n-6) (DPA(n-6)), arachidonic acid C20:4(n-6) (ARA), eicosapentaenoic acid C20:5(n-3) (EPA), stearidonic acid, linolenic acid, alpha linolenic acid (ALA), gamma linolenic acid (GLA), conjugated linoleic acid (CLA) or mixtures thereof. The PUFAs can be in any of the common forms found in natural lipids including but not limited to triacylglycerols, diacylglycerols, monoacylglycerols, phospholipids, free fatty acids, or in natural or synthetic derivative forms of these fatty acids (e.g. calcium salts of fatty acids, esters of fatty acids, including methyl esters, ethyl esters, and the like). Reference to an oil or other composition comprising an LC PUFA, as used in the present invention, can refer to either a composition comprising only a single LC PUFA such as DHA or a composition comprising a mixture of LC PUFAs such as DHA and EPA, or DHA and ARA.

While certain embodiments are described herein with reference to PUFAs for the sake of convenience and conciseness, it is to be understood that products comprising other labile compounds are included within the scope of the invention. PUFAs can be obtained from or derived from a plant (including oilseeds; as one skilled in the art will appreciate, an oilseed is part of a plant), a microorganism, an animal, or mixtures of the foregoing. The microorganisms can be algae, bacteria, fungi or protists. Microbial sources and methods for growing microorganisms comprising nutrients and/or PUFAs are known in the art (Industrial Microbiology and Biotechnology, 2nd edition, 1999, American Society for Microbiology). For example, the microorganisms can be cultured in a fermentation medium in a fermentor. PUFAs produced by microorganisms can be used in the methods and compositions of the present invention. In some embodiments, organisms include those selected from the group consisting of golden algae (such as microorganisms of the kingdom Stramenopiles), green algae, diatoms, dinoflagellates (such as microorganisms of the order Dinophyceae including members of the genus *Crypthecodinium* such as, for example, *Crypthecodinium cohnii*), yeast, and fungi of the genera *Mucor* and *Mortierella*, including but not limited to *Mortierella alpina* and *Mortierella* sect. *schinuckeri*. Members of the microbial group Stramenopiles include microalgae and algae-like microorganisms, including the following groups of microorganisms: Hamatores, Proteromonads, Opalines, Develpayella, *Diplophrys,* Labrinthulids, Thraustochytrids, Biosecids, Oomycetes, Hypochytridiomycetes, Commation, Reticulosphaera, Pelagomonas, Pelagococcus, Ollicola, Aureococcus, Parmales, Diatoms, Xanthophytes, Phaeophytes (brown algae), Eustigmatophytes, Raphidophytes, Synurids, Axodines (including Rhizochromulinaales, Pedinellales, Dictyochales), Chrysorneridales, Sarcinochrysidales, Hydrurales, Hibberdiales, and Chromulinales. The Thraustochytrids include the genera *Schizochytrium* (species include *aggregatum, limnaceum, mangrovei, minutum, octosporum*), *Thraustochytrium* (species include *arudimentale, aureum, benthicola, globosum, kinnei, motivum, multirudimentale, pachyderinum, proliferuin, roseum, striatum*), *Ulkenia* (species include *amoeboidea, kerguelensis, minuta, profunda, radiate, sailens, sarkariana, schizochytrops, visurgensis, yorkensis*), *Aplanochytrium* (species include *haliotidis, kerguelensis, profunda, stocchinoi*), *Japonochytrium* (species include *marinum*), *Althornia* (species include *crouchii*), and *Elina* (species include *marisalba, sinorifica*). The Labrinthulids include the genera *Labyrinthula* (species include *algeriensis, coenocystis, chattonii, macrocystis, macrocystis atlantica, macrocystis macrocystis, mairina, minuta, roscoffensis, valkanovii, vitellina, vitellina pacifica, vitellina vitellina, zopfi*), *Labyrinthomyxa* (species include *marina*), *Labyrinthuloides* (species include *haliotidis, yorkensis*), *Diplophrys* (species include *archeri*), *Pyrrhosorus*\* (species include *marinus*), *Sorodiplophrys*\* (species include *stercorea*), *Chlamydomyxa*\* (species include *labyrinthuloides, montana*). (\*=there is no current general consensus on the exact taxonomic placement of these genera).

Suitable microorganisms include those capable of producing lipids comprising the labile compounds omega-3 and/or omega-6 polyunsaturated fatty acids, and in particular microorganisms that are capable of producing DHA, DPA, EPA or ARA) will be described. More particularly, preferred microorganisms are algae, such as Thraustochytrids of the order Thraustochytriales, including *Thraustochytrium* (including *Ulkenia*) and *Schizochytrium* and including Thraustochytriales which are disclosed in commonly assigned U.S. Pat. Nos. 5,340,594 and 5,340,742, both issued to Barclay, all of which are incorporated herein by reference in their entirety. More preferably, the microorganisms are selected from the group consisting of microorganisms having the identifying characteristics of ATCC number 20888, ATCC number 20889, ATCC number 20890, ATCC number 20891 and ATCC number 20892. Since there is some disagreement among experts as to whether *Ulkenia* is a separate genus from the genus *Thraustochytrium*, for the purposes of this application, the genus *Thraustochytrium* will include *Ulkenia*. Also preferred are strains of *Mortierella schmuckeri* (e.g., including ATCC 74371) and *Mortierella alpina*. Also preferred are strains of *Crypthecodinium cohnii*, including microorganisms having the identifying characteristics of ATCC Nos. 30021, 30334-30348, 30541-30543, 30555-30557, 30571, 30572, 30772-30775, 30812, 40750, 50050-50060, and 50297-50300. Oleaginous microorganisms are also preferred. As used herein, "oleaginous microorganisms" are defined as microorganisms capable of accumulating greater than 20% of the dry weight of their cells in the form of lipids. Genetically modified microorganisms that produce PUFAs are also suitable for the present invention. These can include naturally PUFA-producing microorganisms that have been genetically modified as well as microorganisms that do not naturally produce PUFAs but that have been genetically modified to do so.

Suitable organisms can be obtained from a number of available sources, including by collection from the natural environment. For example, the American Type Culture Collection currently lists many publicly available strains of microorganisms identified above. As used herein, any organism, or any specific type of organism, includes wild strains, mutants, or recombinant types. Growth conditions in which to culture or grow these organisms are known in the art, and appropriate growth conditions for at least some of these organisms are disclosed in, for example, U.S. Pat. No. 5,130,242, U.S. Pat. No. 5,407,957, U.S. Pat. No. 5,397,591, U.S. Pat. No. 5,492,938, and U.S. Pat. No. 5,711,983, all of which are incorporated herein by reference in their entirety.

Another source of PUFAs, in the compositions and methods of the present invention includes a plant source, such as oilseed plants. PUFA-producing plants, in alternate embodiments, can include those genetically engineered to express genes that produce PUFAs and those that produce PUFAs naturally. Such genes can include genes encoding proteins involved in the classical fatty acid synthase pathways, or genes encoding proteins involved in the PUFA polyketide synthase (PKS) pathway. The genes and proteins involved in the classical fatty acid synthase pathways, and genetically modified organisms, such as plants, transformed with such genes, are described, for example, in Napier and Sayanova, *Proceedings of the Nutrition Society* (2005), 64:387-393; Robert et al., *Functional Plant Biology* (2005) 32:473-479; or U.S. Patent Application Publication 2004/0172682. The PUFA PKS pathway, genes and proteins included in this pathway, and genetically modified microorganisms and plants transformed with such genes for the expression and production of PUFAs are described in detail in: U.S. Pat. No. 6,566,583; U.S. Patent Application Publication No. 20020194641, U.S. Patent Application Publication No. 20040235127A1, and U.S. Patent Application Publication No. 20050100995A1, each of which is incorporated herein by reference in its entirety.

Oilseed crops suitable for use in the present invention include soybeans, corn, safflower, sunflower, canola, flax, peanut, mustard, rapeseed, chickpea, cotton, lentil, white clover, olive, palm oil, borage, evening primrose, linseed, and tobacco that have been genetically modified to produce PUFA as described above.

Genetic transformation techniques for microorganisms and plants are well-known in the art. Transformation techniques for microorganisms are well known in the art and are discussed, for example, in Sambrook et al., 1989, *Molecular Cloning: A Laboratory Manual*, Cold Spring Harbor Labs Press. A general technique for transformation of dinoflagellates, which can be adapted for use with *Crypthecodinium cohnii*, is described in detail in Lohuis and Miller, *The Plant Journal* (1998) 13(3): 427-435. A general technique for genetic transformation of Thraustochytrids is described in detail in U.S. Patent Application Publication No. 20030166207, published Sep. 4, 2003. Methods for the genetic engineering of plants are also well known in the art. For instance, numerous methods for plant transformation have been developed, including biological and physical transformation protocols. See, for example, Miki et al., "Procedures for Introducing Foreign DNA into Plants" in *Methods in Plant Molecular Biology and Biotechnology*, Glick, B. R. and Thompson, J. E. Eds. (CRC Press, Inc., Boca Raton, 1993) pp. 67-88. In addition, vectors and in vitro culture methods for plant cell or tissue transformation and regeneration of plants are available. See, for example, Gruber et al., "Vectors for Plant Transformation" in *Methods in Plant Molecular Biology and Biotechnology*, Glick, B. R. and Thompson, J. E. Eds. (CRC Press, Inc., Boca Raton, 1993) pp. 89-119. See also, Horsch et al., *Science* 227:1229 (1985); Kado, C. I., *Crit. Rev. Plant. Sci.* 10:1 (1991); Moloney et al., *Plant Cell Reports* 8:238 (1989); U.S. Pat. No. 4,940,838; U.S. Pat. No. 5,464,763; Sanford et al., *Part. Sci. Technol.* 5:27 (1987); Sanford, J. C., *Trends Biotech.* 6:299 (1988); Sanford, J. C., *Physiol Plant* 79:206 (1990); Klein et al., *Biotechnology* 10:268 (1992); Zhang et al., *Bio/Technology* 9:996 (1991); Deshayes et al., *EMBO J,* 4:2731 (1985); Christou et al., *Proc Natl. Acad. Sci. USA* 84:3962 (1987); Hain et al., *Mol. Gen. Genet.* 199:161 (1985); Draper et al., *Plant Cell Physiol.* 23:451 (1982); Donn et al., In Abstracts of VIIth International Congress on Plant Cell and Tissue Culture IAPTC, A2-38, p. 53 (1990); D'Halluin et al., *Plant Cell* 4:1495-1505 (1992) and Spencer et al., *Plant Mol. Biol.* 24:51-61 (1994).

When oilseed plants are the source of PUFAs, the seeds can be harvested and processed to remove any impurities, debris or indigestible portions from the harvested seeds. Processing steps vary depending on the type of oilseed and are known in the art. Processing steps can include threshing (such as, for example, when soybean seeds are separated from the pods), dehulling (removing the dry outer covering, or husk, of a fruit, seed, or nut), drying, cleaning, grinding, milling and flaking. After the seeds have been processed to remove any impurities, debris or indigestible materials, they can be added to an aqueous solution and then mixed to produce a slurry. In some embodiments, milling, crushing or flaking is performed prior to mixing with water. A slurry produced in this manner can be treated and processed the same way as described for a microbial fermentation broth.

Another biomass source of nutrients, including PUFAs, in the compositions and methods of the present invention includes an animal source. Examples of animal sources include aquatic animals (e.g., fish, marine mammals, and crustaceans such as krill and other eupliausids) and animal tissues (e.g., brain, liver, eyes, etc.) and animal products such as eggs or milk. Techniques for recovery of PUFA-containing oils from such sources are known in the art.

In some embodiments, the labile compound is a vitamin, such as, for example, Vitamin A, Vitamin D, Vitamin E, Vitamin K, Vitamin B1, Vitamin B2, Vitamin B3, Vitamin B6, Vitamin C, Folic Acid, Vitamin B-12, Biotin, Vitamin B5 or mixtures thereof.

In some embodiments, the labile compound is mineral, such as, for example, calcium, iron, iodine, magnesium, zinc, selenium, copper, manganese, chromium, molybdenum, ionic forms of the foregoing, biologically acceptable salts of the foregoing, or mixtures thereof.

In some embodiments, the labile compound comprises an antioxidant, carotenoid or xanthophyll, such as, for example, lycopene, lutein, zeaxanthin, astaxanthin, alpha-lipoic acid, coenzymeQ, beta-carotene or mixtures thereof.

In some embodiments, the labile compound is an amino acid, such as, for example, arginine, aspartic acid, carnitine, cysteine, glutamic acid, glutamine, glycine, histidine, isoleucine, leucine, lysine, methionine, phenylalanine, proline, serine, threonine, tryptophan, tyrosine, valine, SAM-e or mixtures thereof.

In some embodiments, the labile compound comprises a flavor agent, such as a flavor (or essential) oil, oleoresin, other flavoring essence or mixtures thereof. The term flavor oil is generally recognized in the art to be a flavoring aromatic compound and/or oil or extract derived from botanical sources, i.e. leaves, bark, or skin of fruits or vegetables, and which are usually insoluble in water. Examples of flavor oils include peppermint oil, spearmint oil, cinnamon oil, oil of wintergreen, nut oil, licorice, vanilla, citrus oils, fruit essences and mixtures thereof. Citrus oils and fruit essences include apple, apricot, banana, blueberry, cherry, coconut, grape, grapefruit, lemon, lime, orange, pear, peaches, pineapple, plum, raspberry, strawberry, and mixtures thereof. Oleoresin extracts of spices includes, for example oleoresin extracts of tarragon, thyme, sage, rosemary, oregano, nutmeg, basil, bay, cardamom flavor, celery, cilantro, cinnamon, clove, coriander, cumin, fennel, garlic, ginger, mace, marjoram, capsicum, black pepper, white pepper, annatto, paprika, turmeric, cajun, and mixtures thereof.

Without intending to be bound by any theory, the first encapsulant is believed to protect the composition comprising the labile compound to reduce the likelihood of or degree to which the labile compound undergoes a chemical, physical, or biological change or breakdown. The first encapsulant can form a continuous coating on the composition comprising the labile compound (100% encapsulation) or alternatively, form a non-continuous coating (e.g., at a level that provides substantial coverage of the labile compound, for example, coverage at 80%, 90%, 95%, or 99%). In other embodiments, the first encapsulant can be a matrix in which the labile compound is entrapped.

In various embodiments, the composition comprising the labile compound with a first encapsulant can be any of an encapsulated composition comprising a labile compound, a whole cell biomass, a biomass hydrolysate, or an oilseed.

Encapsulation of compositions comprising labile compounds, including PUFAs, with a first encapsulant can be by any method known in the art. For example, the composition comprising a labile compound can be spray-dried. Other methods for encapsulation are known, such as fluid bed drying, drum (film) drying, coacervation, interfacial polymerization, fluid bed processing, pan coating, spray gelation, ribbon blending, spinning disk, centrifugal coextrusion, inclusion complexation, emulsion stabilization, spray coating, extrusion, liposome nanoencapsulation, supercritical fluid microencapsulation, suspension polymerization, cold dehydration processes, spray cooling/chilling (prilling), evaporative dispersion processes, and methods that take advantage of differential solubility of coatings at varying temperatures.

Some exemplary encapsulation techniques are summarized below. It should be recognized that reference to the various techniques summarized below includes the description herein and variations of those descriptions known to those in the art.

In spray drying, the core material to be encapsulated is dispersed or dissolved in a solution. Typically, the solution is aqueous and the solution includes a polymer. The solution or dispersion is pumped through a micronizing nozzle driven by a flow of compressed gas, and the resulting aerosol is suspended in a heated cyclone of air, allowing the solvent to evaporate from the microdroplets. The solidified microparticles pass into a second chamber and are trapped in a collection flask.

Interfacial polycondensation is used to encapsulate a core material in the following manner. One monomer and the core material are dissolved in a solvent. A second monomer is dissolved in a second solvent (typically aqueous) which is immiscible with the first. An emulsion is formed by suspending the first solution in the second solution by stirring. Once the emulsion is stabilized, an initiator is added to the aqueous phase causing interfacial polymerization at the interface of each droplet of emulsion.

In hot melt encapsulation the core material is added to molten polymer. This mixture is suspended as molten droplets in a nonsolvent for the polymer (often oil-based) which has been heated to approximately 10° C. above the melting point of the polymer. The emulsion is maintained through vigorous stirring while the nonsolvent bath is quickly cooled below the glass transition of the polymer, causing the molten droplets to solidify and entrap the core material.

In solvent evaporation encapsulation, a polymer is typically dissolved in a water immiscible organic solvent and the material to be encapsulated is added to the polymer solution as a suspension or solution in organic solvent. An emulsion is formed by adding this suspension or solution to a vessel of vigorously stirred water (often containing a surface active agent to stabilize the emulsion). The organic solvent is evaporated while continuing to stir. Evaporation results in precipitation of the polymer, forming solid microcapsules containing core material.

The solvent evaporation process is designed to entrap a liquid core material in a polymer, copolymer, or copolymer microcapsules. The polymer or copolymer is dissolved in a miscible mixture of solvent and nonsolvent, at a nonsolvent concentration which is immediately below the concentration which would produce phase separation (i.e., cloud point). The liquid core material is added to the solution while agitating to form an emulsion and disperse the material as droplets. Solvent and nonsolvent are vaporized, with the solvent being vaporized at a faster rate, causing the polymer or copolymer to phase separate and migrate towards the surface of the core material droplets. This phase separated solution is then transferred into an agitated volume of nonsolvent, causing any remaining dissolved polymer or copolymer to precipitate and extracting any residual solvent from the formed membrane. The result is a microcapsule composed of polymer or copolymer shell with a core of liquid material.

In solvent removal encapsulation, a polymer is typically dissolved in an oil miscible organic solvent and the material to be encapsulated is added to the polymer solution as a suspension or solution in organic solvent. An emulsion is formed by adding this suspension or solution to a vessel of vigorously stirring oil, in which the oil is a nonsolvent for the polymer and the polymer/solvent solution is immiscible in the oil. The organic solvent is removed by diffusion into the oil phase while continuing to stir. Solvent removal results in precipitation of the polymer, forming solid microcapsules containing core material.

In phase separation encapsulation, the material to be encapsulated is dispersed in a polymer solution by stirring. While continuing to uniformly suspend the material through stirring, a nonsolvent for the polymer is slowly added to the solution to decrease the polymer's solubility. Depending on the solubility of the polymer in the solvent and nonsolvent, the polymer either precipitates or phase separates into a polymer rich and a polymer poor phase. Under proper conditions, the polymer in the polymer rich phase will migrate to the interface with the continuous phase, encapsulating the core material in a droplet with an outer polymer shell.

Spontaneous emulsification involves solidifying emulsified liquid polymer droplets by changing temperature, evaporating solvent, or adding chemical cross-linking agents. Physical and chemical properties of the encapsulant and the material to be encapsulated dictates suitable methods of encapsulation. Factors such as hydrophobicity, molecular weight, chemical stability, and thermal stability affect encapsulation.

Coacervation is a process involving separation of colloidal solutions into two or more immiscible liquid layers (Dowben, R. General Physiology, Harper & Row, New York, 1969, pp. 142-143). Through the process of coacervation compositions comprised of two or more phases and known as coacervates may be produced. The ingredients that comprise the two phase coacervate system are present in both phases; however, the colloid rich phase has a greater concentration of the components than the colloid poor phase.

Low temperature microsphere formation has been described, see, e.g., U.S. Pat. No. 5,019,400. The method is a process for preparing microspheres which involves the use of very cold temperatures to freeze polymer-biologically active agent mixtures into polymeric microspheres. The polymer is generally dissolved in a solvent together with an active agent that can be either dissolved in the solvent or dispersed in the solvent in the form of microparticles. The polymer/active agent mixture is atomized into a vessel containing a liquid non-solvent, alone or frozen and overlayed with a liquefied gas, at a temperature below the freezing point of the polymer/active agent solution. The cold liquefied gas or liquid immediately freezes the polymer droplets. As the droplets and non-solvent for the polymer is warmed, the solvent in the droplets thaws and is extracted into the non-solvent, resulting in hardened microspheres.

Phase separation encapsulation generally proceeds more rapidly than the procedures described in the preceding paragraphs. A polymer is dissolved in the solvent. An agent to be encapsulated then is dissolved or dispersed in that solvent. The mixture then is combined with an excess of nonsolvent and is emulsified and stabilized, whereby the polymer solvent no longer is the continuous phase. Aggressive emulsification conditions are applied in order to produce microdroplets of the polymer solvent. After emulsification, the stable emulsion is introduced into a large volume of nonsolvent to extract the polymer solvent and form microparticles. The size of the microparticles is determined by the size of the microdroplets of polymer solvent.

Another method for encapsulating is by phase inversion nanoencapsulation (PIN). In PIN, a polymer is dissolved in an effective amount of a solvent. The agent to be encapsulated is also dissolved or dispersed in the effective amount of the solvent. The polymer, the agent and the solvent together form a mixture having a continuous phase, wherein the solvent is the continuous phase. The mixture is introduced into an effective amount of a nonsolvent to cause the spontaneous formation of the microencapsulated product, wherein the solvent and the nonsolvent are miscible.

In preparing a first encapsulant of a composition comprising a labile compound the conditions can be controlled by one skilled in the art to yield encapsulated material with the desired attributes. For example, the average particle size, hydrophobicity, biocompatibility, ratio of core material to encapsulant, thermal stability, and the like can be varied by one skilled in the art.

In the instance where the composition comprising the labile compound with a first encapsulant comprises a whole cell biomass, it will be recognized that the cell, e.g., a microbial cell, can include a labile compound such as a PUFA, a vitamin or other beneficial compound. Whole cells include those described above as sources for PUFAs. The cellular structure (e.g., a cell wall or cell membrane), at least in part, constitutes the first encapsulant and it provides protection to the labile compound by virtue of isolating it from the surrounding environment. As used herein, biomass can refer to multiple whole cells that, in the aggregate, constitute a biomass. A microbial biomass can refer to a biomass that has not been separated from the culture media in which the biomass organism was cultured. An example of a culture media is a fermentation broth. In a further embodiment, the biomass is separated from its culture media by a solid/liquid separation prior to treatment by methods of the present invention. Typical solid/liquid separation techniques include centrifugation, filtration, and membrane filter pressing (plate and frame filter press with squeezing membranes). This (harvested) biomass usually has a dry matter content varying between 5% and 60%. If the water content is too high, the biomass can be dewatered by any method known in the art, such as, for example, spray drying, fluidized bed drying, lyophilization, freeze drying, tray drying, vacuum tray drying, drum drying, solvent drying, excipient drying, vacuum mixer/reactor drying, drying using spray bed drying, fluidized spray drying, conveyor drying, ultrafiltration, evaporation, osmotic dehydration, freezing, extrusion, absorbent addition or other similar methods, or combinations thereof. The drying techniques referenced herein are well known in the art. For example, excipient drying refers to the process of atomizing liquids onto a bed of material such as starch and solvent drying refers to a process where a solvent, miscible with water, is used in excess to replace the water. The biomass can optionally be washed in order to reduce extracellular components. The fermentation broth can be dried and then reconstituted to a moisture content of any desired level before treatment by any of the methods of the present invention. Alternatively, hydrolyzing enzymes can be applied to dried biomass to form a biomass hydrolysate, described elsewhere herein.

In a further embodiment in which the composition comprising the labile compound with a first encapsulant comprises a whole cell, the whole cell is a probiotic organism. As is well understood, probiotics are microorganisms that are intended to confer a beneficial health effect when consumed by favorably altering the intestinal microflora balance, inhibiting the growth of harmful bacteria, producing beneficial compositions, promoting good digestion, boosting immune function, and/or increasing resistance to infection. For example, *Lactobacillus acidophilus* is considered to be beneficial because it produces vitamin K, lactase, and anti-microbial substances such as acidolin, acidolphilin, lactocidin, and bacteriocin. Probiotics include, for example, lactic acid bacteria, and bifidobacteria. Lactic acid bacteria include, for example, *Lactococcus lactis, Lactobacillus acidolphilus, Lactobacillus crispatus, Lactobacillus amylovorous, Lactobacillus gallinarum, Lactobacillus gasseri, Lactobacillus johnsonii, Lactobacillus rhamnosus, Lactobacillus brevis, Lactobacillus fermentum, Lactobacillus plantarum, Lactobacillus helveticus, Lactobacillus casei, Lactobacillus delbruckii, Lactobacillus bulgaricus, Lactobacillus plantarum,* and *Lactobacillus GG. Bifidobacteria* include, for example, *Bifidobacterium bifidum, Bifidobacterium breve, Bifidobacterium infantis,* and *Bifidobacterium longum*. Additional probiotic bacteria include, for instance, *Streptococcus thermophilus* and *Leuconostoc mesenteroides*. Without intending to be bound by theory, the beneficial effects of these microorganisms can be preserved if encapsulated by a second encapsulant. In one embodiment, the probiotic microorganism is encapsulated under conditions in which the microorganism retains its beneficial probiotic properties. For example, encapsulation with a second encapsulant can be performed at a temperature lower than the temperature required for inactivation of the microorganism, generally in the range of 90-100° C.

In a further embodiment, the composition comprising the labile compound with a first encapsulant comprises an emulsified biomass hydrolysate. Such compositions and methods for making the same are described in detail in U.S. Provisional Patent Application Ser. No. 60/680,740, filed on May 12, 2005; U.S. Provisional Patent Application Ser. No. 60/781,430, filed on Mar. 10, 2006; and U.S. patent application Ser. No. 11/433,752, filed on May 12, 2006, all of which are incorporated herein by reference. Briefly, an emulsified biomass hydrolysate is obtained by hydrolyzing a nutrient-containing biomass to produce a hydrolyzed biomass, and emulsifying the hydrolyzed biomass to form a stable product. The stable product is typically an emulsion or a dry composition resulting from subsequent drying of the emulsion.

In a further embodiment, the composition comprising the labile compound with a first encapsulant comprises an oilseed. Such oilseeds can be selected from those generally described above as sources for PUFAs and can include oilseeds from plants that have been genetically modified and plants that have not been genetically modified.

As noted above, products of the present invention include a second encapsulant of the first encapsulant. Without intending to be bound by theory, the second encapsulant of the first encapsulant is believed to further protect the composition comprising the labile compound to reduce the likelihood of or degree to which the labile compound undergoes a chemical, physical, or biological change or breakdown. The second encapsulant can form a continuous coating on the first encapsulant (100% encapsulation) or alternatively, form a non-continuous coating (e.g., at a level that provides substantial coverage of the first encapsulant, for example, coverage at 80%, 90%, 95%, or 99%). In other embodiments, the second encapsulant can be a matrix in which the first encapsulant is entrapped.

The second encapsulant can be applied by any method known in the art, such as spray drying, fluid bed drying, drum (film) drying, coacervation, interfacial polymerization, fluid bed processing, pan coating, spray gelation, ribbon blending, spinning disk, centrifugal coextrusion, inclusion complexation, emulsion stabilization, spray coating, extrusion, liposome nanoencapsulation, supercritical fluid microencapsulation, suspension polymerization, cold dehydration processes, spray cooling/chilling (prilling), evaporative dispersion processes, and methods that take advantage of differential solubility of coatings at varying temperatures. While a second encapsulant can encapsulate a single discrete particle (i.e., a particle that is a first encapsulant of a composition comprising a labile compound), a second encapsulant can alternatively encapsulate a plurality of discrete particles within a single second encapsulant.

In preferred embodiments, the second encapsulant of the first encapsulant is a prill coating. Prilling is a process of encapsulating compounds in a high temperature melt matrix wherein the prilling material goes from solid to liquid above room temperature. As used herein, a prill coating is a wax, oil, fat, or resin, typically having a melting point of about 25-150° C. The prill coating can envelop the first encapsulant completely (100% encapsulation), or the prill coating can envelop the first encapsulant at some level less than 100%, but at a level which provides substantial coverage of the first encapsulant, for example, at about 50%, about 60%, about 70%, about 80%, about 90%, about 95%, or about 99%. In some embodiments, the prill coating is edible. More particularly, the prill coating can comprise, for example, a fatty acid monoglyceride; a fatty acid diglyceride; a fatty acid triglyceride; a free fatty acid (such as stearic acid, palmitic acid, and oleic acid); tallow (such as beef tallow, mutton tallow, and lamb tallow); lard (pork fat); beeswax; lanolin; shell wax; insect wax including Chinese insect wax; vegetable wax, carnauba wax; candelilla wax; bayberry wax; sugar cane wax; mineral wax; paraffin microcrystalline petroleum wax; ozocerite wax; ceresin wax; montan synthetic wax, low molecular weight polyolefin; polyol ether-esters, sorbitol; Fischer-Tropsch process synthetic wax; rosin; balsam; shellac; stearylamide; ethylenebisstearylamide; hydrogenated castor oil; esters of pentaerythritol; mono and tetra esters of stearic acid; vegetable oil (such as cottonseed oil, sunflower oil, safflower oil, soybean oil, corn oil, olive oil, canola oil, linseed oil, flaxseed oil); hydrogenated vegetable oil; and mixtures and derivatives of the foregoing. In some embodiments, the prill coating is hydrogenated cottonseed oil, hydrogenated sunflower oil, hydrogenated safflower oil, hydrogenated soybean oil, hydrogenated corn oil, hydrogenated olive oil, hydrogenated canola oil, hydrogenated linseed oil, or hydrogenated flaxseed oil.

In some embodiments, the prill coating further comprises an additional component. The additional component can be, for example, a fat-soluble or fat dispersible antioxidant, oxygen scavenger, colorant or flavor agent. Such an antioxidant can be, for example, vitamin E, tocopherol, butylhydroxytoluene (BHT), butylhydroxyanisole (BHA), tert-butylhydroquinone (TBHQ), propyl gallate (PG), vitamin C, ascorbyl palmitate, phospholipids, a Maillard reaction product, natural antioxidants (such as spice extracts, e.g., rosemary or oregano extracts, and seed extracts, e.g., grapeseed extracts or pomegranate extract), and combinations thereof. The Maillard reaction product can be added as an antioxidant in addition to Maillard reaction products described elsewhere. Such an oxygen scavenger can be, for example, ascorbic acid, isoascorbic acid, erythorbic acid, or mixtures of salts thereof. The colorant component is selected from the group consisting of water soluble natural or artificial dyes that include FD&C dyes (food, drug and cosmetic use dyes) of blue, green, orange, red, yellow and violet; iron oxide dyes; ultramarine pigments of blue, pink, red and violet; and equivalents thereof. The dyes discussed above are well known, and are commercially available materials. Examples of flavor agents include flavor oils such as peppermint oil, spearmint oil, cinnamon oil, oil of wintergreen, nut oil, licorice, vanilla, citrus oils, fruit essences and mixtures thereof. Citrus oils and fruit essences include apple, apricot, banana, blueberry, cherry, coconut, grape, grapefruit, lemon, lime, orange, pear, peaches, pineapple, plum, raspberry, strawberry, and mixtures thereof. Other examples of flavor agents include oleoresin extracts of spices includes, for example oleoresin extracts of tarragon, thyme, sage, rosemary, oregano, nutmeg, basil, bay, cardamom flavor, celery, cilantro, cinnamon, clove, coriander, cumin, fennel, garlic, ginger, mace, marjoram, capsicum, black pepper, white pepper, annatto, paprika, turmeric, cajun, and mixtures thereof.

In some embodiments, the prill coating is applied by a prilling method with the resultant product being a prill or bead. Prilling is also known in the art as spray cooling, spray chilling, and/or matrix encapsulation. Prilling is similar to spray drying in that a core material, in the present case, a first encapsulant of a composition comprising a labile compound, is dispersed in a liquefied coating or wall material and atomized. Unlike spray drying, there is no water present to be evaporated. The core material and the second encapsulant can be atomized into cooled or chilled air, which causes the wall to solidify around the core. In spray chilling, the prill coating typically has a melting point between about 32° C. and about 42° C. In spray cooling, the prill coating typically has a melting point of between about 45° C. and about 122° C. In some embodiments, the prill coating is applied by a modified prilling method. A modified prilling method, for example, can be a spinning disk process or centrifugal coextrusion process. In some embodiments, the product having a prill coating is in a form that results in a free-flowing powder.

In some embodiments, the prill coating is applied so as to form a product into configurations other than powders, such as chips or flakes. In all such embodiments, the equipment converts the liquid prill coating material into a solid by cooling it while it is applied to a first encapsulated product. For example, the prill coating and first encapsulant of a composition comprising a labile compound are cooled as the mixture passes through rollers and is formed into a flat sheet, which can then be processed into chips or flakes. Alternatively, the mixture can be extruded through dies to form shapes or through blades to be cut into ribbons.

In a further embodiment, the second encapsulant of the first encapsulant is a fluid bed coating. Application of a fluid bed coating is well suited to uniformly coat or encapsulate individual particulate materials. The apparatus for applying a fluid bed coating is typically characterized by the location of a spray nozzle at the bottom of a fluidized bed of solid particles, and the particles are suspended in a fluidizing air stream that is designed to induce cyclic flow of the particles past the spray nozzle. The nozzle sprays an atomized flow of coating solution, suspension, or other coating material. The atomized coating material collides with the particles as they are carried away from the nozzle. The temperature of the fluidizing air is set to appropriately solidify the coating material shortly after colliding with the particles. Suitable coating materials include the materials identified above as materials for prill coatings. For example, hot-melt coatings are a solid fat (at room temperature) that has been melted and sprayed on to a particle (i.e., a first encapsulant) where it solidifies. A benefit of using hot-melt coatings is that they have no solvent to evaporate and are insoluble in water, they are also low cost and easily obtainable. Typical coating volume for hot-melt application to a first encapsulant is 50% (one half hot-melt coating and one half first encapsulant and core material).

Additional encapsulants, for example, a third encapsulant, a fourth encapsulant, a fifth encapsulant, and so on, are also contemplated in the present invention. Additional encapsulants can be applied by methods described herein, and can provide additional desirable properties to the products. For example, the additional encapsulants can further enhance the shelf life of the products, or modify the release properties of the product to provide for controlled release or delayed release of the labile compound.

In some embodiments, the product further comprises a Maillard reaction product (MRP). The Maillard reaction occurs when reducing sugars and amino acids react. A reducing sugar is a sugar with a ketone or an aldehyde functional group, which allows the sugar to act as a reducing agent in the Maillard reaction. This reaction occurs in most foods on heating. Maillard reaction chemistry can affect desirable flavors and color of a wide range of foods and beverages. While not being bound by theory, it is believed that formation of MRPs in the products of the invention produces aromas and flavors that are desirable for inclusion in food products or other products that are consumed. MRPs can also possess antioxidant activity, and without being bound by theory, it is believed that this property of the MRPs imparts increased stability and shelf life to the products of the present invention. The Maillard reactions are well-known and from the detailed specification herein, temperature and time required to carry the reaction to the desired extent can be determined.

MRPs can be included in the products of the present invention in a number of ways. In some embodiments, the MRP is a product of a reducing sugar and an amino acid source that is a protein. Proteins that can be used to produce an MRP include casein, whey solids, whey protein isolate, soy protein, skim milk powder, hydrolyzed casein, hydrolyzed whey protein, hydrolyzed soy protein, non-fat milk solids, gelatin, zein, albumin, and the like. Alternatively, amino acids can be provided directly or by in situ formation, such as by acid, alkaline or enzymatic hydrolysis. In various embodiments, the reducing sugar can include sugars, such as fructose, glucose, glyceraldehyde, lactose, arabinose, and maltose. As used herein, the term reducing sugar also includes complex sources of reducing sugars. For example, suitable complex sources include corn syrup solids and modified starches such as chemically modified starches and hydrolysed starches or dextrins, such as maltodextrin. Hydrolysed starches (dextrins) are used in some embodiments. In some embodiments, the reducing sugar is formed in situ from, for example, a compound that is not itself a reducing sugar, but comprises reducing sugars. For example, starch is not a reducing sugar, but is a polymer of glucose, which is a reducing sugar. Hydrolysis of starch, by chemical or enzymatic means, yields glucose. This hydrolysis can take place in situ, to provide the reducing sugar glucose.

The reducing sugars and protein used to form MRPs in various embodiments of the present invention can naturally occur in the first encapsulant of the composition or the second encapsulant. For example, in the instance of the first encapsulant being a microbial biomass hydrolysate emulsion, the reducing sugars and proteins can be present without being added. Alternatively, various embodiments of the invention contemplate the addition of some or all of the reducing sugar and protein.

In one embodiment, an MRP is formed by contacting the first encapsulant with the second encapsulant. Thus, the invention provides in a further embodiment, a product comprising a composition comprising a labile compound, a first encapsulant of the composition, and a second encapsulant of the first encapsulant, wherein the product further comprises an MRP formed by contacting the first encapsulant with the second encapsulant. In this embodiment, at the time the first encapsulant and second encapsulants are brought into contact, they are done so in the presence of reducing sugars and protein under suitable temperature and time conditions to form MRPs. For example, when the second encapsulant is a prill coating, contacting the first encapsulant with the liquefied prill coating at elevated temperature in the presence of reducing sugars and proteins can promote the formation of MRPs. In general, the temperature of such a reaction ranges from about 20° C. to about 150° C. with from about 80° C. to about 110° C. being preferred. The time of the reaction ranges from about 1 minute to about several hours, depending on the temperature. At the preferred higher temperature range, the time of reaction is preferably about 1 minute to about 20 minutes. Reference to "time of reaction" in this paragraph refers to the time that the first encapsulant is in contact with the liquefied prill coating before cooling to solidify the coating.

In another embodiment, the Maillard reaction product is formed in a non-aqueous environment. Accordingly, in one embodiment, the invention provides a product comprising a composition comprising a labile compound, a first encapsulant of the composition, and a second encapsulant of the first encapsulant, wherein the product further comprises a Maillard reaction product formed in a non-aqueous environment. For example, when the second encapsulant is a prill coating, contacting the first encapsulant with the liquefied prill coating at elevated temperature in the presence of reducing sugars and proteins can promote the formation of MRPs in the environment of the liquefied prill coating, i.e., a non-aqueous environment. In this embodiment, the reaction is analogous to browning in oil. Water is produced as a byproduct of the Maillard reaction, and therefore the presence of water is inhibitory for the formation of MRPs. Thus, it should be recognized that reference to a non-aqueous environment, encompasses an environment comprising small amounts of water, such as that produced by the Maillard reaction. By carrying out the Maillard reaction in a non-aqueous environment, it is believed that the reaction occurs more readily than it would in the presence of water and that reaction times are therefore reduced significantly. Additionally, undesirable side products that can form upon heating the reaction are minimized with shorter reaction times. For example, in the case where a PUFA is the labile compound, oxidation products that form upon heating are reduced. Thus the resulting product contains a high-quality PUFA which contains little or no oxidation products.

In some embodiments, the first encapsulated product comprises the amino acid source and the reducing sugar source. In some embodiments, the first encapsulated product comprises the amino acid source and the second encapsulant comprises the reducing sugar source. In other embodiments, the first encapsulated product comprises the reducing sugar source and the second encapsulant comprises the amino acid source. In still other embodiments, the second encapsulant comprises the reducing sugar and the amino acid source. In other embodiments, the amino acid source and/or the reducing sugar source can be present in both the first encapsulated product and the second encapsulant.

In another embodiment, the second encapsulant comprises an MRP. Accordingly, in one embodiment, the invention provides a product comprising a composition comprising a labile compound, a first encapsulant of the composition, a second encapsulant of the first encapsulant, wherein the second encapsulant further comprises a Maillard reaction product. In this embodiment, for example, the MRP can be produced separately and introduced into the second encapsulant prior to encapsulation of the first encapsulant. Alternatively, in embodiments in which one or both of the reducing sugar and amino acid source are in the second encapsulant, MRPs will be formed throughout the second encapsulant. As the second encapsulant is cooled and formed into a coating, as in a prilling process, the MRPs will be dispersed throughout the second encapsulant. In such embodiments, MRPs will occur, not just at the interface between the first and second encapsulants, but in the outer portions of the second encapsulant away from the first encapsulant. For example, the MRPs will occur in the outer 75%, 50% or 25% of the second encapsulant.

The products of the present invention can be is characterized in general by parameters such as particle size and distribution, particle geometry, active contents and distribution, release mechanism, and storage stability. In some embodiments in which the product is in a powder fonn, the product has a particle size of between about 10 μm and about 3000 μm, and in another embodiment between about 40 μm and 300 μm. Generally, the products are insoluble in cold to warm water, and in some embodiments, have a water solubility of less than about 0.1 mg/ml. The solubility of the product in a given environment will depend on the melting point of the second encapsulant. One skilled in the art can select an appropriate second encapsulant for the anticipated use and environment for the product.

The products of the invention are generally physically stable. In some embodiments, the product is physically stable for at least about 30 days, at least about 60 days, at least about 90 days, at least about 120 days, at least about one year, at least about three years, or at least about five years. Physical stability refers to the ability of a product to maintain its physical appearance over time. For example, the structure of a product, with the first encapsulant of the composition and the second encapsulant of the first encapsulant, is substantially maintained without, for example, the composition migrating through the first encapsulant to the second encapsulant.

In various embodiments, the products the invention are oxidatively stable. As used herein, oxidative stability refers to the lack of significant oxidation in the labile compound over a period of time. Oxidative stability of fats and oils can be determined by one skilled in the art. For example, peroxide values indicate the amount of peroxides present in the fat and are generally expressed in milli-equivalent oxygen per kg fat or oil. Additionally, anisidine values measure carbonyl (aldehydes and ketones) components which are formed during deterioration of oils. Anisidine values can be determined as described in IUPAC, Standard Methods for the Analysis of Oils, Fats and Derivatives, 6th Ed. (1979), Pergamon Press, Oxford, Method 2,504, page 143. The products of the invention, in some embodiments, have a peroxide value of less than about 2, or less than about 1. In other embodiments, products of the invention have an anisidine value of less than about 1. In some embodiments, the product is oxidatively stable for at least about 30 days, at least about 60 days, at least about 90 days, at least about 120 days, at least about one year, at least about three years, or at least about five years.

In other embodiments of the invention, the products have desirable aromas or flavors. In some embodiments, a desirable aroma or flavor is due to the presence of Maillard reaction products. In other embodiments, a desirable aroma or flavor, or lack of an undesirable aroma or flavor, is imparted to the product by the physical and oxidative stability of the product. The presence of desirable aromas and flavors can be evaluated by one skilled in the art. For example, the room-odor characteristics of cooking oils can be reproducibly characterized by trained test panels in room-odor tests (Mounts, J.

Am. Oil Chem. Soc. 56:659-663, 1979). A standardized technique for the sensory evaluation of edible vegetable oils is presented in AOCS' Recommended Practice Cg 2-83 for the Flavor Evaluation of Vegetable Oils (Methods and Standard Practices of the AOCS, 4th Edition (1989)). The technique encompasses standard sample preparation and presentation, as well as reference standards and method for scoring oils. Panelists can be asked to rank the products on a Hedonic scale. Such a scale can be a scale of 1-10 used for the overall odor and flavor in which 10 is assigned to "complete blandness", and 1 to "strong obnoxiousness". The higher score will indicate better product in terms of aroma and flavor. In some embodiments, products of the present invention will have a score of at least about 5, at least about 6, at least about 7, at least about 8, at least about 9 or about 10 in such a test. Such evaluations can be conducted at various time frames, such as upon production of the product, at least about 60 days after production, at least about 90 days after production, at least about 120 days after production, at least about one year after production, at least about three years after production, or at least about five years after production.

The amount of labile compound in the products of the invention will vary depending on the type of compound, the encapsulation materials used, and the methods used for forming the product. In some embodiments, the product comprises labile compound in an amount of at least about 1 to 20 weight percent, in 1% increments and up to about 40 to 80 weight percent, in 1% increments, for example, between about 1 weight percent and about 80 weight percent, between about 5 weight percent and about 70 weight percent, between about 10 weight percent and about 60 weight percent, or between about 15 weight percent and about 50 weight percent.

The present invention also provides methods for preparing the products described herein. Some of these methods have been described above.

In one particular embodiment, the invention provides a method for preparing a product comprising encapsulating a first encapsulated product in the presence of an amino acid source and a reducing sugar to form a second encapsulated product. In the process of encapsulating a first encapsulated product, Maillard reaction products are formed. In this embodiment, the first encapsulated product comprises an encapsulant of a labile compound.

In some embodiments, this method further includes handling the labile compound under conditions that reduce oxidative degradation prior to encapsulation. Such handling can include, for example, maintaining the product in an inert atmosphere, the addition of antioxidants to the labile compound, and so forth. In some embodiments, this method further comprises processing the second encapsulated product into a particulate form. In some embodiments, the particulate form can be selected from the group consisting of a bead, a chip, and a flake.

In one embodiment, the first encapsulated product is formed by a method comprising emulsifying an aqueous dispersion of a polyunsaturated fatty acid, protein and reducing sugar to form an emulsion. This method further includes drying the emulsion to form the first encapsulated product.

In some embodiments, encapsulating the first encapsulated product comprises contacting the first encapsulated product with a prilling material, spraying the mixture of the first encapsulated product with the prilling material into droplets, and cooling the droplets below the melting point of the prilling material to form the second encapsulated product. In some embodiments, the prilling material has a melting point in the range of about 32° C. to about 122° C. In other embodiments, the step of contacting the first encapsulated product with the prilling material is conducted at a temperature above about 85° C. In still other embodiments, the step of contacting the first encapsulated product with the prilling material is conducted for between about 1 minute and about 15 minutes. In some embodiments, the prilling material is hydrogenated vegetable oil, and the step of contacting the first encapsulated product with the prilling material is conducted for between about 1 minute and about 15 minutes, between 80° C. and 100° C.

In some embodiments, the first encapsulated product comprises about 25 wt % to about 80 wt % labile compound; about 5 wt % to about 25 wt % of an amino acid source; and about 15 wt % to about 70 wt % of a reducing sugar.

The products of the present invention can be incorporated into nutritional products (including food products, food supplements, feed products, feed supplements, and nutraceutical products), cosmetic products, pharmaceutical products, and industrial products. Products can be in the form of chewable tablets, quick dissolve tablets, effervescent tablets, reconstitutable powders, elixirs, liquids, solutions, suspensions, emulsions, tablets, multi-layer tablets, bi-layer tablets, capsules, soft gelatin capsules, hard gelatin capsules, caplets, lozenges, chewable lozenges, beads, powders, granules, particles, dispersible granules, dietary supplements, genetically engineered designer foods, herbal products, and processed foods.

A nutritional product may be used directly as a food product, food supplement, feed product, feed supplement or as an ingredient in any of the foregoing. Food products can be liquid food products or solid food products. Liquid food products include, for example, infant formula, liquid meals, liquid eggs, multivitamin syrups, meal replacers, medicinal foods, soups and syrups, and beverages. As used herein a beverage is any one of various liquids for drinking. Beverages include, for example, energy drinks, fruit juices, milk, and milk products. Solid food products include, for example, baby food, yogurt, cheese, cereal, powdered mixes, baked goods, including, for example, such items as cakes, cheesecakes, pies, cupcakes, cookies, bars, breads, rolls, biscuits, muffins, pastries, scones, and croutons, food bars including energy bars, and processed meats. Also included are doughs, batters, ice creams; frozen desserts; frozen yogurts; waffle mixes; salad dressings; and replacement egg mixes, baked goods such as cookies, crackers, sweet goods, snack cakes, pies, granola/snack bars, and toaster pastries; salted snacks such as potato chips, corn chips, tortilla chips, extruded snacks, popcorn, pretzels, potato crisps, and nuts; specialty snacks such as dips, dried fruit snacks, meat snacks, pork rinds, health food bars and rice/corn cakes; and confectionary snacks such as candy. In some embodiments, particularly including some solid food products, the product can be processed into a particulate form. For example, the particulate form can be selected from the group consisting of a bead, a chip, and a flake.

Feed or feed supplements can be prepared for any companion animal or pet or for any animal whose meat or products are consumed by humans. The term "animal" means any organism belonging to the kingdom Animalia and includes, without limitation, any animal from which poultry meat, seafood, beef, pork or lamb is derived. Seafood is derived from, without limitation, fish, shrimp and shellfish. Animal product includes any product other than meat derived from such animals, including, without limitation, eggs, milk or other products. When fed to such animals, nutrients such as LC PUFAs can be incorporated into the flesh, milk, eggs or other products of such animals to increase their content of these nutrients.

A cosmetic product is a product that is applied to the skin and can function either to improve the appearance of the skin or to provide some dermatological benefit to the skin.

An industrial product is a product such as a raw material for manufacturing paints, wood products, textiles, adhesives, sealants, lubricants, leather, rope, paper pulp, plastics, fuels, oil, rubber working fluids, or metal working fluids.

Additional objects, advantages, and novel features of this invention will become apparent to those skilled in the art upon examination of the following examples thereof, which are not intended to be limiting.

EXAMPLES

Example 1

This example illustrates the production of a product of the present invention in which the composition comprising a labile compound is an algal oil and the first encapsulant is formed by spray drying. The second encapsulant is a prill coating of hydrogenated canola wax.

Spray dried particles of algal oil in a sugar-protein matrix, prepared in accordance with the process generally described in EP 1 616 486, entitled Powdered Compositions Containing an Edible Oil and Their Use in Food Products, which is incorporated herein by reference, with a mean size of 78 μm were prilled in hydrogenated canola wax (Stable Flake—CN, Cargill). This material was prilled at a concentration of 33% (one-third by weight spray dried particles with two-thirds by weight canola oil) with good results. The resulting product had a mean particle size of 157 microns.

Example 2

This example illustrates the production of a product of the present invention in which first encapsulant of the composition comprising the labile compound is a biomass hydrolysate. The second encapsulant is a prill coating of hydrogenated canola wax.

Two pounds of dried biomass hydrolysate powder containing 22% DHA were added to molten, hydrogenated canola fat (Stable Flake—CN, Cargill) at 100° C. to make a molten solution containing 25% biomass hydrolysate (5.5% DHA) at 80° C. The biomass hydrolyzate powder was produced in accordance with the process generally described in U.S. patent application Ser. No. 11/433,752, filed on May 12, 2006, entitled Biomass Hydrolysate and Uses and Production Thereof, which is incorporated herein by reference.

The resultant solution was atomized using compressed air at 154° C. and 45 psi into a prill tower using ambient air as the cooling air. The powder was collected and analyzed for particle size, solubility and sensory profile. The particle size of the original hydrolysate power was 70.5 micron. The average particle size of the prills was 82.9 micron. The powder was found to be mostly water insoluble with improved, pleasant aroma and acceptable sensory profile.

Example 3

This example illustrates the stability of the products of the invention. Two samples were utilized. The product of the present invention is one in which composition comprising a labile compound is an algal oil and the first encapsulant is formed by reacting a solution comprising a protein, soy protein isolate, and a reducing sugar at a starting pH of 10 to achieve a degree of protein hydrolysis of between about 1% and about 15%, and combining the reacted solution with the algal oil, such that the reacted solution forms an encapsulant on the algal oil, and spray drying resulting mixture. This method is described in detail in U.S. provisional patent application Ser. No. 60/945,040, filed Jun. 19, 2007, which is herein incorporated by reference in its entirety. The second encapsulant is a prill coating of hydrogenated soy fat. For comparison purposes, the algal oil with a first encapsulant and no second encapsulant was used.

Product samples were stored at 40° C. to accelerate oxidative degradation. They were evaluated weekly by trained sensory panelists in order to detect oxidation products. Additionally, the samples were tested weekly by Gas Chromatography/Mass Spectrometry for static headspace of propanal and hexanal. Results are expressed as induction period. Induction period for the sample was defined as the time when an average sensory score of 3.0 or greater first appeared (based on a 5 point scale). Head space induction periods are defined as the time there is a sharp increase (inflection point) in the concentration of volatiles hexanal and propanal. Results are shown in FIG. 1. Sensory analysis indicates prilling of core material results in nearly an 8-fold increase in induction period (3 wks vs. 23 wks). Additionally, relative stability as determined by GC/MS indicates a 9-fold increase in shelf life (2 wks vs. 19 wks). Results such as these clearly underscore the additional stability imparted as singly encapsulated product is prilled.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiment described hereinabove is further intended to explain the best mode known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A product comprising:
   a composition comprising a labile compound;
   a first encapsulant of the composition, wherein said first encapsulant forms a continuous or non-continuous coating on said composition, or wherein said first encapsulant is a matrix in which said labile compound is entrapped; and
   a second encapsulant of the first encapsulant, wherein the second encapsulant is a prill coating and comprises a Maillard reaction product,
   and wherein the product comprising said composition and said first and second encapsulants is physically stable for at least about 30 days, and wherein said first encapsulant of said composition comprising said labile compound is a whole cell or a biomass hydrolysate derived from microorganisms.

2. The product of claim 1, wherein the labile compound is selected from the group consisting of a polyunsaturated fatty acid, a vitamin, a mineral, an antioxidant, a hormone, an amino acid, a protein, a carbohydrate, a coenzyme, a flavor agent, and mixtures of the foregoing.

3. The product of claim 2, wherein the labile compound comprises a polyunsaturated fatty acid from a source selected from the group consisting of a plant, an oilseed, a microorganism, an animal, and mixtures of the foregoing.

4. The product of claim 3, wherein the source is a plant selected from the group consisting of soybean, corn, safflower, sunflower, canola, flax, peanut, mustard, rapeseed, chickpea, cotton, lentil, white clover, olive, palm, borage, evening primose, linseed and tobacco and mixtures thereof.

5. The product of claim 4, wherein the plant is an oilseed plant.

6. The product of claim 5, wherein the source is the oilseed of an oilseed plant.

7. The product of claim 3, wherein the source is a microorganism selected from the group consisting of Thraustochytriales, dinoflagellates, and *Mortierella*.

8. The product of claim 3, wherein the source is an animal selected from aquatic animals.

9. The product of claim 2, wherein the labile compound comprises a polyunsaturated fatty acid having a chain length of at least 18 carbons.

10. The product of claim 2, wherein the labile compound comprises a polyunsaturated fatty acid selected from the group consisting of docosahexaenoic acid, omega-3 docosapentaenoic acid, omega-6 docosapentaenoic acid, arachidonic acid, eicosapentaenoic acid, stearidonic acid, linolenic acid, alpha linolenic acid (ALA), gamma linolenic acid (GLA), conjugated linolenic acid (CLA) and mixtures thereof.

11. The product of claim 2, wherein the labile compound comprises a vitamin selected from the group consisting of Vitamin A, Vitamin D, Vitamin E, Vitamin K, Vitamin B1, Vitamin B2, Vitamin B3, Vitamin B6, Vitamin C, Folic Acid, Vitamin B-12, Biotin, Vitamin B5 and mixtures thereof.

12. The product of claim 2, wherein the labile compound comprises a mineral selected from the group consisting of calcium, iron, iodine, magnesium, zinc, selenium, copper, manganese, chromium, molybdenum and mixtures thereof.

13. The product of claim 2, wherein the labile compound comprises an antioxidant selected from the group consisting of lycopene, lutein, zeaxanthin, alpha-lipoic acid, coenzymeQ, beta-carotene and mixtures thereof.

14. The product of claim 2, wherein the labile compound comprises an amino acid selected from the group consisting of arginine, aspartic acid, carnitine, cysteine, glutamic acid, glutamine, glycine, histidine, isoleucine, leucine, lysine, methionine, phenylalanine, proline, serine, threonine, tryptophan, tyrosine, valine, SAM-e and mixtures thereof.

15. The product of claim 2, wherein the flavor agent comprises a flavor oil, oleoresin or mixtures thereof.

16. The product of claim 1, wherein the first encapsulant of the composition comprising the labile compound is a microorganism selected from the group consisting of *Lactococcus lactis, Lactobacillus acidophilus, Lactobacillus crispatus, Lactobacillus amylovorous, Lactobacillus gallinarum, Lactobacillus gasseri, Lactobacillus johnsonii, Lactobacillus rhamnosus, Lactobacillus brevis, Lactobacillus fermentum, Lactobacillus plantarum, Lactobacillus helveticus, Lactobacillus casei, Lactobacillus delbruckii, Lactobacillus bulgaricus, Lactobacillus GG, Bifidobacterium bifidum, Bifidobacterium breve, Bilidobacterium infantis, Bifidobacterium longum, Streptococcus thermophilus* and *Leuconostoc mesenteroides*.

17. The product of claim 1, wherein the first encapsulant of the composition comprising the labile compound is a dried whole cell.

18. The product of claim 17, wherein the dried whole cell is a spray-dried whole cell.

19. The product of claim 1, wherein the first encapsulant is prepared by a method selected from the group consisting of fluid bed drying, drum (film) drying, coacervation, interfacial polymerization, fluid bed processing, pan coating, spray gelation, ribbon blending, spinning disk, centrifugal coextrusion, inclusion complexation, emulsion stabilization, spray coating, extrusion, liposome nanoencapsulation, supercritical fluid microencapsulation, suspension polymerization, cold dehydration processes, spray chilling (prilling), and evaporative dispersion processes.

20. The product of claim 1, wherein the prill coating is selected from the group consisting of a fatty acid monoglyceride; a fatty acid diglyceride; a fatty acid triglyceride; a free fatty acid; tallow; lard; beeswax; lanolin; shell wax; insect wax; vegetable wax; carnauba wax; candelilla wax; bayberry wax; sugar cane wax; mineral wax; paraffin microcrystalline petroleum wax; ozocerite wax; ceresin wax; montan synthetic wax, low molecular weight polyolefin; polyol ether esters, sorbitol; Fischer-Tropsch process synthetic wax; rosin; balsam; shellac; stearylamide; ethylenebisstearylamide; hydrogenated castor oil; esters of pentaerythritol; mono and tetra esters of stearic acid; vegetable oil; a hydrogenated vegetable oil; and mixtures and derivatives of the foregoing.

21. The product of claim 20, wherein the prill coating is a free fatty acid selected from the group consisting of stearic acid, palmitic acid, and oleic acid.

22. The product of claim 20, wherein the tallow is selected from the group consisting of beef tallow, mutton tallow, pork tallow, and lamb tallow.

23. The product of claim 20, wherein the hydrogenated vegetable oil is selected from the group consisting of hydrogenated cottonseed oil, hydrogenated sunflower oil, hydrogenated safflower oil, hydrogenated soybean oil, hydrogenated corn oil, hydrogenated olive oil, hydrogenated canola oil, hydrogenated linseed oil, and hydrogenated flaxseed oil.

24. The product of claim 1, wherein the Maillard reaction product is a reaction product of a reducing sugar and a protein selected from the group consisting of casein, whey solids, whey protein isolate, soy protein, skim milk powder, hydrolyzed casein, hydrolyzed whey protein, hydrolyzed soy protein, non-fat milk solids, gelatin, zein, and albumin.

25. The product of claim 1, wherein the Maillard reaction product is a reaction product of a protein and a reducing sugar selected from the group consisting of fructose, glucose, glyceraldehyde, lactose, arabinose, maltodextrin, corn syrup solids and maltose.

26. A product selected from the group consisting of a food product, a cosmetic product, a pharmaceutical product, a nutraceutical product, a paint, a wood product, a textile, an adhesive, a sealant, a lubricant, leather, rope, paper pulp, a plastic, a fuel, oil, a rubber working fluid or a metal working fluid, wherein the product comprises the product of claim 1.

27. The product of claim 1, wherein the product is physically stable for at least about 120 days.

28. The product of claim 1, wherein the product is in a form selected from the group consisting of a free-flowing powder, a bead, a chip, and a flake.

29. A product selected from the group consisting of a food product, a cosmetic product, a pharmaceutical product, a nutraceutical product, a paint, a wood product, a textile, an adhesive, a sealant, a lubricant, leather, rope, paper pulp, a plastic, a fuel, oil, a rubber working fluid or a metal working fluid, wherein the product comprises the product of claim 2.

30. The product of claim 1, wherein said Maillard reaction product was formed by contacting the first encapsulant with the second encapsulant.

31. The product of claim 1, wherein said Maillard reaction product is at the interface of said first and second encapsulants.

32. The product of claim 1, wherein the product is in a form selected from the group consisting of a free-flowing powder, a bead, a chip, and a flake.

33. The product of claim 1, wherein the Maillard reaction product was formed in a non-aqueous environment.

34. A method for preparing a product comprising:
encapsulating a first encapsulated product in the presence of an amino acid source and a reducing sugar to form a second encapsulated product, whereby Maillard reaction products are formed in the second encapsulant, and wherein the first encapsulated product comprises an encapsulant of a labile compound, wherein said encapsulant of said labile compound forms a continuous or non-continuous coating on said compound, or wherein said first encapsulant is a matrix in which said labile compound is entrapped, and wherein said first encapsulant of the composition comprising said labile compound is a whole cell or a biomass hydrolysate derived from microorganisms and wherein said second encapsulant is a prill coating.

35. The product of claim 1, wherein said second encapsulant encapsulates a single discrete particle within a single second encapsulant.

36. The product of claim 1, wherein said second encapsulant encapsulates a plurality of discrete particles within a single second encapsulant.

37. The product of claim 1, wherein said product comprises three to five encapsulants.

38. The product of claim 1, wherein said Maillard reaction product is found throughout said second encapsulant.

* * * * *